(12) United States Patent
Hernacki et al.

(10) Patent No.: US 8,176,562 B1
(45) Date of Patent: May 8, 2012

(54) PRIVACY PROTECTION DURING REMOTE ADMINISTRATION

(75) Inventors: Brian Hernacki, Mountain View, CA (US); Sourabh Satish, Fremont, CA (US); Timothy G. Brown, Ft. Edward, NY (US)

(73) Assignee: Symantec Corporation, Mountain View, CA (US)

( * ) Notice: Subject to any disclaimer, the term of this patent is extended or adjusted under 35 U.S.C. 154(b) by 822 days.

(21) Appl. No.: 11/963,701

(22) Filed: Dec. 21, 2007

(51) Int. Cl.
  *G06F 7/04* (2006.01)
  *G06F 17/30* (2006.01)
  *H04N 7/16* (2011.01)

(52) U.S. Cl. ............ 726/26; 726/1; 726/2; 726/3; 726/4; 726/5; 726/21; 726/27; 726/28; 726/29; 726/30; 709/223; 709/229

(58) Field of Classification Search ................ 726/1
See application file for complete search history.

(56) References Cited

U.S. PATENT DOCUMENTS

| | | | |
|---|---|---|---|
| 6,023,507 A * | 2/2000 | Wookey | 709/224 |
| 7,506,371 B1 * | 3/2009 | Ben-Natan | 726/18 |
| 2003/0233583 A1 * | 12/2003 | Carley | 713/201 |
| 2004/0107342 A1 * | 6/2004 | Pham et al. | 713/165 |
| 2005/0132231 A1 * | 6/2005 | Williamson et al. | 713/201 |
| 2007/0143827 A1 * | 6/2007 | Nicodemus et al. | 726/2 |
| 2008/0022368 A1 * | 1/2008 | Field et al. | 726/4 |

* cited by examiner

*Primary Examiner* — Nathan Flynn
*Assistant Examiner* — Bryan Wright
(74) *Attorney, Agent, or Firm* — Brill Law Office; Jeffrey Brill

(57) ABSTRACT

A remote access manager protects the privacy of identified local file system content while a local computer is being accessed by a remote administrator. A local user inputs a privacy policy which identifies restricted access levels for specified files, file types and folders. During remote administration sessions, the remote access manager intercepts attempts to access the local file system, and enforces the privacy policy. Thus, the remote administrator's access to the local file system content is restricted according to the security policy.

20 Claims, 2 Drawing Sheets

PRIVACY PROTECTION DURING REMOTE ADMINISTRATION

TECHNICAL FIELD

This invention pertains generally to the remote administration of computing devices, and more specifically to protecting the privacy of select content on a user's computer while it is being accessed by a remote administrator.

BACKGROUND

It is common to give a remote administrator access to a computer system, so that the remote administrator can aid the local user by performing tasks and services such as set-up, configuration and trouble shooting. Typically, a remote administrator logs-in to the local computer over a network, and has administrator level access to the user's computer while logged-in. Commercial software exists today that supports this type of remote administration.

One problem with remote administration is that the remote party has system level privileges on the local computer, and can thus access all of the user's folders and files. However, local users may not want the administrator to be able to view or access certain content. Currently, to keep select files private, the user would have to pre-provision these files into some type of locked storage, and ensure that the remote administrator is not provided with access. While this is technically possible, it is a largely manual process which is very error prone. Additionally, this type of solution can cause performance issues, and in any case is beyond the technical ability of many users.

It would be desirable to be able to robustly protect the privacy of select user content during remote administration sessions.

SUMMARY

A remote access manager protects the privacy of identified local file system content while a local computer is being accessed by a remote administrator. A local user inputs a privacy policy which identifies restricted access levels for specified files, file types and folders. During remote administration sessions, the remote access manager intercepts attempts to access the local file system, and enforces the privacy policy. Thus, the remote administrator's access to the local file system content is restricted according to the security policy.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
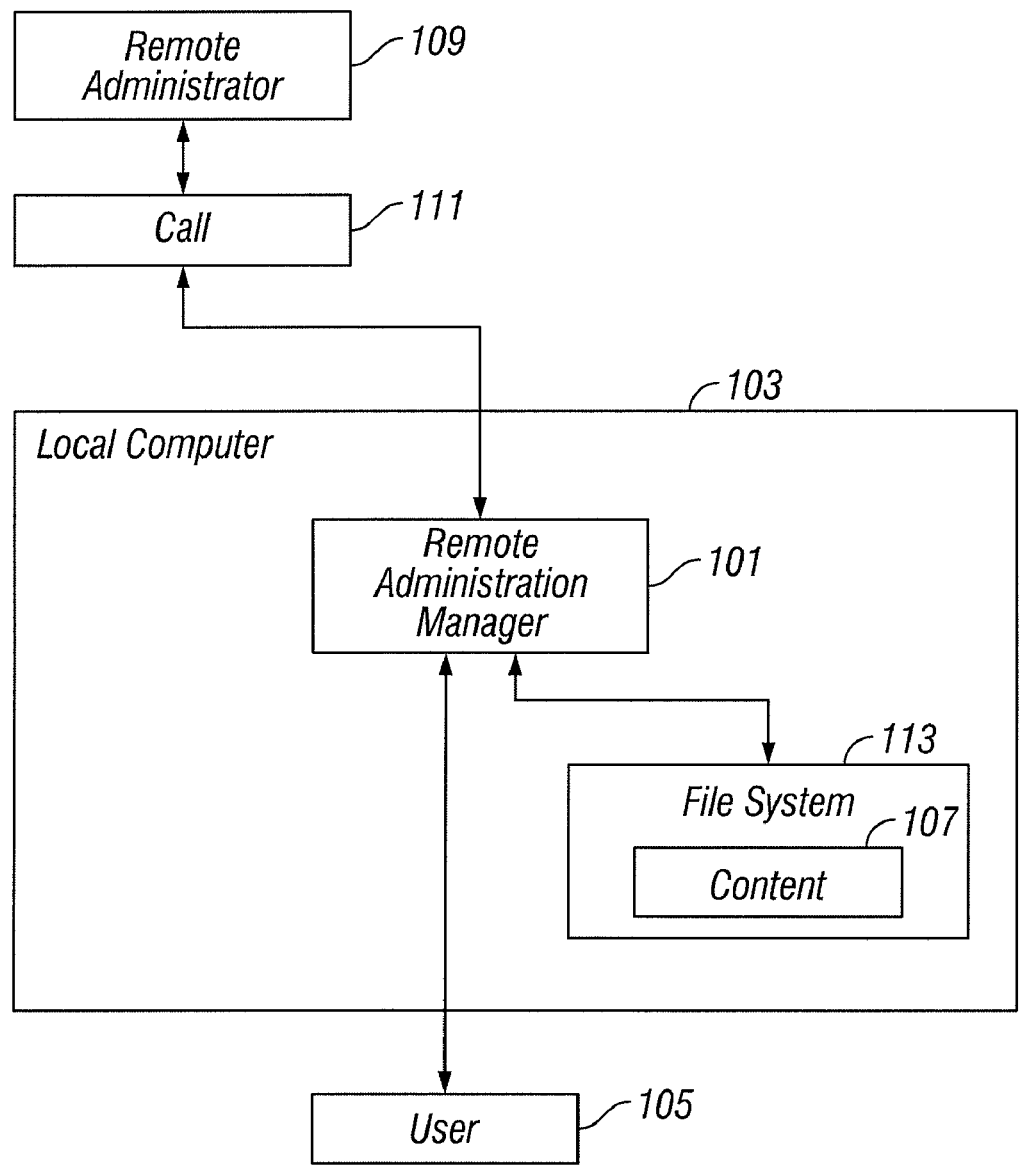
FIG. 1 is a block diagram illustrating a system in which a remote administration manager enforces a privacy policy on a user's local computer during remote administration sessions, according to some embodiments of the present invention.

FIG. 1 illustrates a system 100 in which a remote administration manager 101 enforces a privacy policy on a user's 105 local computer 103 during remote administration sessions, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

The remote administration manager 101 running on the local computer 103 can be configured by the user 105 to shield identified content 107 from the remote administrator 109. The user 105 can select categories (e.g., Quicken files, all Word documents in the My Documents folder, etc.) or identify individual files 107 or folders 107 to privatize. The user 105 can identify content 107 to protect to the remote administration manager 101 by operating a user interface, or in other ways such as via a command line or configuration file.

In some embodiments, the remote administration manager 101 actively identifies personal files 107, file types 107 and/or folders 107 that are likely to comprise personal or sensitive content 107. For example, the remote administration manager 101 could flag such personal content 107 as, e.g., user email or financial data, as being private. In such embodiments, the remote administration manager 101 can either prompt the user 105 as to whether identified content 107 should be kept private, and/or simply treat identified content 107 as being such.

The user 105 can also specify what access level to private content 107 the remote administrator 109 is to have, if any. Identified files 107, files types 107 and files at specified locations 107 can be hidden from the administrator 109, visible to the administrator 109 but not readable, read-only, etc. Privacy policies can also be specified at a per administrator 109 level, such that different administrators 109 are given different access privileges. A user 105 can define an access policy at any level of granularity, specifying different access levels for different content 107 for different administrators 109, etc. In some embodiments, the remote administration manager 101 provides at least some default access policy criteria, which can be edited and supplemented by the user 105, as desired.

Once the security policy is configured, a remote administrator 109 is allowed to initiate a session. During such sessions, the remote administration manager 101 intercepts calls 111 to the file system 113, and enforces the security policy. For example, if the user 105 has configured a given file 107 to be invisible, it is never displayed to the administrator 109. If the user 105 has masked the filename, a mask name (e.g., file123.xyz) is displayed. If the user 105 has masked the content, the file 107 can be opened and read, but the content is obscured. If the file 107 is to be displayed but locked, it is listed but attempts to open it fail. When the remote session is disconnected, the remote administration manager 101 stops intercepting calls 111 to the file system 113. Note that these access controls are present even where the remote administrator 109 mirrors a user 105 session. The implementation mechanics of intercepting system calls 111 to a file system 113 and enforcing a file system access policy are known to those, of ordinary skill in the relevant art, and the usage thereof within the context of the present invention will be readily apparent to those of such a skill level in light of this specification.

In some embodiments of the present invention, the user 105 can override any denial of access to content 107 according to the security policy. For example, in order to perform a desired task for the user 105, the administrator 109 may need to access a given file 107 which has been configured as locked to the administrator 109. In such a case, the user 105 can manually override the policy for this specific access only. Another option is for the user 105 to open the file 105 himself, and expose it to the remote administrator 109. In one embodiment, when an attempted access to content 107 is denied to the administrator 109, the remote access manager 101 prompts the user 105, asking him whether he wishes to override the denial. In another embodiment, users 105 are not prompted, but instead proactively indicate to the remote access manager 101 that they wish to override a specific access denial.

Figure 2:
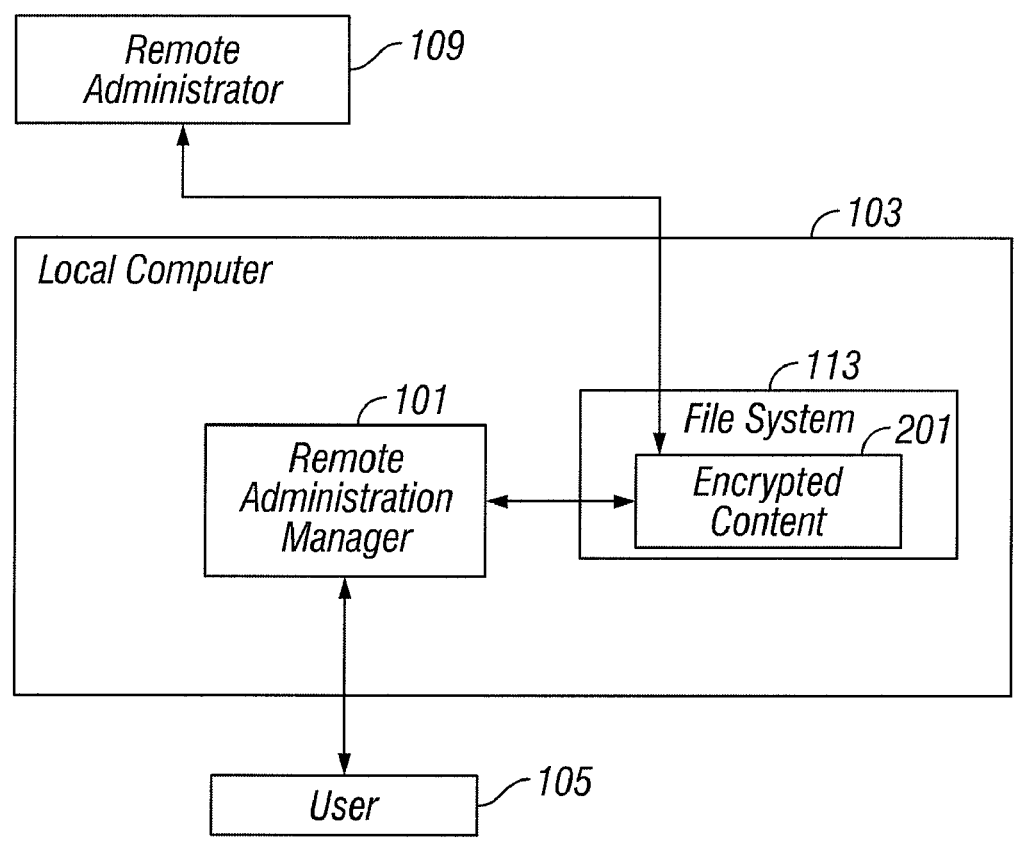
FIG. 2 is a block diagram illustrating enforcing a privacy policy during remote administration sessions, according to another embodiment of the present invention.

As illustrated in FIG. 2, in another embodiment, rather than intercept calls 111 to the file system 113 during remote administration sessions, the remote administration manager 101 pre-encrypts protected files 107, for the duration of the session only. During the remote session, the administrator 109 cannot read the encrypted content 201. While less flexible than the above described embodiment, the encryption solution is simpler to implement, and does not have the runtime overhead associated with filtering file system 113 access. However, it exposes filenames to the administrator 109, thus providing the names of files 107 that might later be decrypted. The implementation mechanics of encrypting and decrypting file system content 107 is known to those of ordinary skill in the relevant art, and the usage thereof within the context of the present invention will be readily apparent to those of such a skill level in light of this specification.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for protecting the privacy of identified content on a local computer while the local computer is being accessed by a remote administrator, the method comprising the steps of:

running a remote administration manager on the local computer, wherein the remote administration manager is operable to automatically traverse the local computer and identify specific local computer content to which access is to be restricted in accordance with a privacy policy for the local computer, the local privacy policy being configurable by a user of the local computer;

identifying, by the remote administration manager running on the local computer, the a locally configured privacy policy for the local computer, the privacy policy specifying at least one restrictive access level to prevent at least one remote administrator with administrator level access to the local computer from accessing specific local file system content during remote administration sessions;

during at least one remote administration session by the at least one remote administrator with administrator level access to the local computer, detecting, by the remote administration manager, an attempt by the at least one remote administrator to access the specific local file system content; and preventing, by the remote administration manager, the detected attempt by the at least one remote administrator to access the specific local file system content, thereby enforcing the local privacy policy.

2. The method of claim 1 wherein identifying a privacy policy for the local computer further comprises: receiving input from a user of the local computer specifying at least a part of the privacy policy.

3. The method of claim 1 wherein identifying a privacy policy for the local computer further comprises: automatically traversing at least a part of the local file system; and automatically identifying, by the local computer, specific local file system content to which access is to be restricted according to the privacy policy.

4. The method of claim 1 wherein identifying a privacy policy for the local computer further comprises: automatically identifying, by the local computer, specific local file system content to which access is to be restricted according to the privacy policy, the identified specific local file system content comprising at least one type from a group of types consisting of: at least one specific file, at least one specific file type, at least one specific file within at least one specifically identified folder and at least one specific file type within at least one specifically identified folder.

5. The method of claim 1 wherein identifying a privacy policy for the local computer further comprises: receiving an indication from a user of the local computer specifying at least one restrictive access level to be applied to at least some local file system content according to the privacy policy, the at least one restrictive access level being from a group consisting of: invisible, non-readable, non-executable, read-only, locked, content-masked and name-masked.

6. The method of claim 1 wherein identifying a privacy policy for the local computer further comprises: receiving an indication from a user of the local computer specifying at least one particular remote administrator for whom access to at least some file system content is to be restricted according to the privacy policy.

7. The method of claim 1 further comprising: receiving an indication from a user to override a restriction on a remote administrator's access to local file system content; and responsive to the received indication, allowing the restricted access.

8. The method of claim 1 wherein enforcing the privacy policy further comprises: intercepting attempts by the at least one remote administrator to access local file system content; and restricting the at least one remote administrator's access to local file system content according to the security policy.

9. The method of claim 1 wherein enforcing the privacy policy further comprises: prior to the at least one remote administration session by the at least one remote administrator, encrypting identified file system content; and after the at least one remote administration session by the at least one remote administrator, decrypting the identified file system content.

10. At least one non-transitory computer readable medium storing a computer program product for, when executed by a processor, protecting the privacy of identified content on a local computer while the local computer is being accessed by a remote administrator, the computer program product comprising:

program code for running a remote administration manager on the local computer, wherein the remote administration manager is operable to automatically traverse the local computer and identify specific local computer content to which access is to be restricted in accordance with a privacy policy for the local computer, the local privacy policy being configurable by a user of the local computer;

program code for identifying, by the remote administration manager running on the local computer, the a locally configured privacy policy for the local computer, the privacy policy specifying at least one restrictive access level to prevent at least one remote administrator with administrator level access to the local computer from accessing specific local file system content during remote administration sessions; program code for, during at least one remote administration session by the at least one remote administrator with administrator level access to the local computer, detecting, by the remote administration manager, an attempt by the at least one remote administrator to access the specific local file system content; and program code for preventing, by the remote administration manager, the detected attempt by the at least one remote administrator to access the specific local file system content, thereby enforcing the local privacy policy.

11. The computer program product of claim 10 wherein the program code for identifying a privacy policy for the local computer further comprises: program code for receiving input from a user of the local computer specifying at least a part of the privacy policy.

12. The computer program product of claim 10 wherein the program code for identifying a privacy policy for the local computer further comprises: program code for automatically traversing at least a part of the local file system; and program code for automatically identifying, by the local computer, specific local file system content to which access is to be restricted according to the privacy policy.

13. The computer program product of claim 10 wherein the program code for identifying a privacy policy for the local computer further comprises: program code for automatically identifying, by the local computer, specific local file system content to which access is to be restricted according to the privacy policy, the identified specific local file system content comprising at least one type from a group of types consisting of: at least one specific file, at least one specific file type, at least one specific file within at least one specifically identified folder and at least one specific file type within at least one specifically identified folder.

14. The computer program product of claim 10 wherein the program code for identifying a privacy policy for the local computer further comprises: program code for receiving an indication from a user of the local computer specifying at least one restrictive access level to be applied to at least some local file system content according to the privacy policy, the at least one restrictive access level being from a group consisting of: invisible, non-readable, non-executable, read-only, locked, content-masked and name-masked.

15. The computer program product of claim 10 wherein the program code for identifying a privacy policy for the local computer further comprises: program code for receiving an indication from a user of the local computer specifying at least one particular remote administrator for whom access to at least some file system content is to be restricted according to the privacy policy.

16. The computer program product of claim 10 further comprising: program code for receiving an indication from a user to override a restriction on a remote administrator's access to local file system content; and program code for responsive to the received indication, allowing the restricted access.

17. The computer program product of claim 10 wherein the program code for enforcing the privacy policy further comprises: program code for intercepting attempts by the at least one remote administrator to access local file system content; and program code for restricting the at least one remote administrator's access to local file system content according to the security policy.

18. The computer program product of claim 10 wherein the program code for enforcing the privacy policy further comprises: program code for, prior to the at least one remote administration session by the at least one remote administrator, encrypting identified file system content; and program code for, after the at least one remote administration session by the at least one remote administrator, decrypting the identified file system content.

19. A computer system for protecting the privacy of identified local content while the computer system is being accessed by a remote administrator, the computer system comprising:

means for running a remote administration manager on the local computer, wherein the remote administration manager is operable to automatically traverse the local computer and identify specific local computer content to which access is to be restricted in accordance with a privacy policy for the local computer, the local privacy policy being configurable by a user of the local computer;

means for identifying, by the remote administration manager running on the local computer, the a locally configured privacy policy for the local computer, the privacy policy specifying at least one restrictive access level to prevent at least one remote administrator with administrator level access to the local computer from accessing specific local file system content during remote administration sessions;

means for, during at least one remote administration session by the at least one remote administrator with administrator level access to the local computer, detecting, by the remote administration manager, an attempt by the at least one remote administrator to access the specific local file system content; and means for preventing, by the remote administration manager, the detected attempt by the at least one remote administrator to access the specific local file system content, thereby enforcing the local privacy policy.

20. The computer system of claim 19 wherein the means for enforcing the privacy policy further comprise: means for intercepting attempts by the at least one remote administrator to access local file system content; and means for restricting the at least one remote administrator's access to local file system content according to the security policy.

* * * * *

UNITED STATES PATENT AND TRADEMARK OFFICE
CERTIFICATE OF CORRECTION

| | | |
|---|---|---|
| PATENT NO. | : 8,176,562 B1 | |
| APPLICATION NO. | : 11/963701 | |
| DATED | : May 8, 2012 | |
| INVENTOR(S) | : Brian Hernacki, Sourabh Satish and Timothy G. Brown | |

It is certified that error appears in the above-identified patent and that said Letters Patent is hereby corrected as shown below:

Col. 4, line 28, replace "a locally" with "locally"

Col. 5, line 44, replace "a locally" with "locally"

Col. 6, line 67, replace "a locally" with "locally"

Signed and Sealed this
Tenth Day of July, 2012

David J. Kappos
*Director of the United States Patent and Trademark Office*